UNITED STATES PATENT OFFICE.

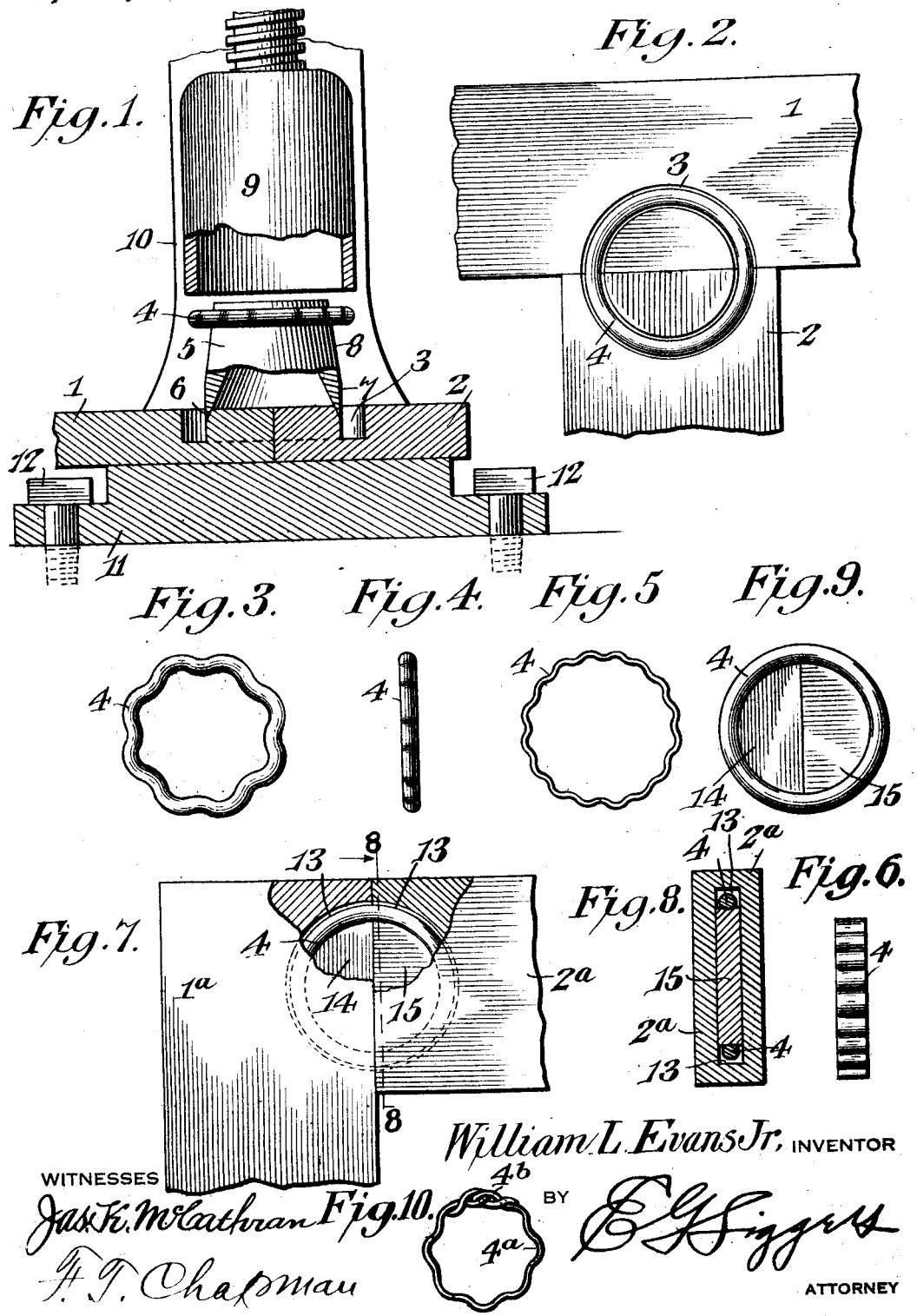

WILLIAM L. EVANS, JR., OF WASHINGTON, INDIANA.

JOINT.

1,069,538.  Specification of Letters Patent.  Patented Aug. 5, 1913.

Application filed August 31, 1912. Serial No. 718,161.

*To all whom it may concern:*

Be it known that I, WILLIAM L. EVANS, Jr., a citizen of the United States, residing at Washington, in the county of Daviess and State of Indiana, have invented a new and useful Joint, of which the following is a specification.

This invention has reference to improvements in joints, and its object is to provide a means whereby two joining members may be firmly united against liability of separation even in the event of shrinkage of the parts making up the joint, as in the case of a joint between two wooden members.

In accordance with the present invention the parts to be joined are each formed with a seat so related to that of the other as together to form a continuous seat common to both members when the parts are in the position in which they are to be connected. There is also provided an unbroken or effectively unbroken ring or like structure of an initially free diameter less than that of the common seat designed to receive the connecting ring or link, and in order that the ring or link may be introduced into the seat in the parts to be joined, the free internal diameter of the ring or link must be increased, wherefore the ring or link is so shaped that it may be expanded to a greater free diameter than initially, but it is so made as to still have a tendency to return toward the initial form, wherefore when placed in the seat this returning tendency will cause it to grip the parts of the joint in which the seat is formed and resist parting of the members.

The invention will be best understood from a consideration of the following detailed description, taken in connection with the accompanying drawings forming a part of this specification, with the further understanding that while three different forms which the invention may assume are illustrated in the drawings, the invention is susceptible of other embodiments, wherefore it is not confined to any exact conformity with the showing of the drawings, but may be changed and modified so long as such changes and modifications mark no material departure from the salient features of the invention.

In the drawings:—Figure 1 is an elevation partly in section of a means for completing the joint. Fig. 2 is a plan view of a completed joint in one practical form of the invention. Fig. 3 is a plan view of a connecting ring or link in its initial condition. Fig. 4 is an edge view of the structure of Fig. 3. Fig. 5 is a plan view of a slightly modified form of the connecting ring or link. Fig. 6 is an edge view thereof. Fig. 7 is a plan view partly in section of a modified form of joint differing in some respects from that shown in Fig. 2. Fig. 8 is a section on the line 8—8 of Fig. 7. Fig. 9 is a plan view of the insert or tenon employed in the structure of Figs. 7 and 8. Fig. 10 is a plan view of still another form of ring or link.

Referring to the drawings, there are shown two members 1 and 2 which it is assumed are to be joined together, one member, say, the member 2, abutting the other member 1. While the two parts to be joined are in position, a groove or seat 3 is so formed as to be included in both members 1 and 2 and to traverse the point of abutment. In the drawings it is assumed that the seat 3 is circular and extends in the structure of Figs. 1 and 2 from one face of the two members 1 and 2 into the body toward the other face for a suitable distance. While the circular form of the groove or seat 3 has the advantage of being easily produced, the invention is not of necessity confined to such form of seat. Again, it is to be observed that the seat or groove 3 extends equally into both members 1 and 2 on opposite sides of the line of junction, but the invention is not of necessity confined to this exact arrangement.

In order to unite the two members 1 and 2 against separation, there is seated in the groove 3 a ring 4, but the term ring is not here used in the sense that it is of necessity circular, but is intended to include any loop-shaped structure whether circular or of other contour, and this ring 4 is endless either actually or effectively. Before the ring 4 is introduced into the groove 3 it is crimped or corrugated, as shown in Figs. 3 and 4, or in Figs. 5 and 6, or is otherwise shaped, so that its free internal diameter is less than the internal diameter of the groove 3 and without the application of force enough to expand the ring to a greater free diameter it would not enter the groove 3. In Figs. 3 and 4 the ring 4 is indicated as made of a rod or wire of round cross section, while in Figs. 5 and 6 it is indicated as an endless band of less thickness than width, although the relative thickness or width is immaterial, the difference between Figs. 3 and 4 being principally in that in one form the cross section of the ring is approximately circular and in the other it is polygonal. In both forms, however, the effective diameter is initially less than that of the groove 3. By the application of a suitably directed force the effective internal diameter of the ring 4 may be increased by the obliteration of the crimping or corrugating, and then the ring will enter the groove 3 but still there remains a tendency for the ring to return to its initial crimped or corrugated form, wherefore, with the parts properly proportioned the ring tightly embraces the inner wall of the groove 4, thus holding the members 1 and 2 firmly together, and should there be a tendency to shrink where these parts are made of wood or some other shrinkable material, the ring will still remain in tight embrace with respect to the inner wall of the groove 3, because of the inherent tendency of the ring to contract with respect to its internal diameter by a return to the original crimped form.

In order to apply the ring, there is provided an apparatus comprising an anvil 5 having one edge 6 adapted to embrace the outer edge of the inner wall of the groove 3, so that this anvil may be properly positioned with relation to the groove 3. Adjacent the edge 6 the anvil is cylindrical, as indicated at 7, and from the cylindrical portion toward the other end of the anvil it tapers, as indicated at 8 until at the smaller end of the anvil it is of a size which will permit the application of the ring 4. A follower 9 is also provided and this follower is cylindrical and of a size to enter the groove 3, but in passing on to the anvil it engages the ring 4 already there placed, and by the application of an appropriate force the ring 4 is moved along the anvil progressively expanding until on reaching the cylindrical portion 7 it is in a circular form or in very close approach thereto, the crimps having been more or less smoothed out, and a further movement of the follower 9 forces the ring along the cylindrical portion of the anvil and ultimately therefrom into the groove 3 where the ring seats with a gripping force commensurate with the tendency of the ring to return to its original crimped condition, which tendency is powerful enough to hold the members 1 and 2 of the joint in continued firm relation, even though the parts should ultimately shrink to some extent.

The follower 9 may be mounted in any appropriate manner upon the standard 10 rising from a base 11 designed to be secured by screws 12 to any appropriate support and the base 11 may also constitute a table for holding the parts 1 and 2 to be joined together during the application of the ring.

The structure shown in Fig. 2 is found very effective for many purposes, but it sometimes happens that it is not desirable that the joint should be visible, although in the structure of Fig. 2 the ring may be hidden by a suitable filling introduced into the groove 3 after the ring is lodged therein. To produce a blind joint the arrangement shown in Figs. 7, 8 and 9 may be employed, such blind joint being desirable in case of window or door frames or casings, or in any position where blind joints are to be preferred, including sash and doors. Instead of forming a groove 3, two members 1ª and 2ª where abutting are each formed with a semi-circular channel 13 so that when the parts are abutted, a circular seat is provided, it being understood that the circular form is described and illustrated because of the facility with which it may be produced and not because the invention is at all confined to this particular arrangement. Usually in joints of this character the grain of the wood, assuming the joint to be between wooden parts, runs lengthwise of the parts joined together, and this is indicated in Fig. 7 by the direction of surface shading. There is provided a tenon structure made up of two parts 14, 15, each of similar circular contour and abutting along a diameter, but the grain of these two members which are assumed to be made of wood are so arranged one to the other as to agree with the direction of the grain in the two parts 1ª and 2ª to be joined together. In the particular structure shown the two parts 14 and 15 each comprise a half disk of a thickness to fit snugly in the seat or mortise 13 of the respective members 1ª and 2ª to be joined together. The two half disks 14 and 15 are embraced by a ring 4 applied in the manner already described with relation to the structure of Fig. 2, and this ring 4 may be the same initially as illustrated in Figs. 3 and 5, the drawing showing the same kind of a ring as is indicated in Figs. 2 and 3. The ring 4 when applied to the two half disks 14 and 15 firmly grips these disks and holds them in close relation, with the grain of one disk at an appropriate angle to that of the other and by the surface shading in Fig. 7 the grain of these two half disks is indicated as running in the same direction as the grain of the respective members 1ª and 2ª to be joined together. Now, by applying glue or other appropriate cementing material to the joined half disks 14 and 15 after the application of the gripping ring 4, the tension thus provided is introduced into the mortise seats 13 of the two members 1ª and 2ª and the parts are held together until the cement hardens. Because of the relation of the grain of the two half disks 14 and 15 to that of the members 1ª and 2ª to be joined and also the presence of the ring 4, any tendency of the two parts of the joint pulling away is most effectively resisted.

In the present invention the ring is unbroken either actually or effectively, and its action is not that of a broken ring which may be readily expanded because of its elasticity and grips any object to which it is applied by the elastic tendency to return to its initial condition; but the change in shape of the ring of the present invention to cause it to enter the seat provided for it is brought about only by the application of a force far in excess of any force which would be necessary to bend a split ring. With the present invention the ring is expanded circumferentially without affecting its continuity, and the tendency to return toward the original form is circumferential rather than diametric, which latter is a tendency of an elastic split ring to contract after having been expanded.

The tenon or spline made up of the two half disks 14 and 15 and the embracing or binding ring need not of necessity be made of two pieces, but the construction shown is to be preferred, since it permits of the grain of the wood being arranged as stated, or in any other relation desired. The spline and double mortises take the place of ordinary mortise and tenon construction.

In cutting the groove or mortise for the blind joint the mandrel holding the cutter prevents the formation of the mortise as a full half circle and the expanded ring therefore will not touch the wood of the edge of the stile or end of the rail, thus leaving space for the movement of the ring when it returns toward its original corrugated form in case of shrinkage of the wood.

In the foregoing description the ring or link 4 is set forth as actually or effectively unbroken, but the showing is that of an integrally continuous or unbroken ring. In Fig. 10 there is shown a ring or link 4ª which may be made of a bar or rod of suitable cross-section, round or other shape, bent into a ring or loop with the ends twisted together preferably in the form of interlocked eyes 4ᵇ. The ring may be made of steel wire with the ends twisted together either as indicated or otherwise, then corrugated or crimped and then tempered. The rings 4 shown in Figs. 3 and 5 may also be made of steel and tempered. So far as the purposes of the present invention are concerned, the ring or loop 4ª is as effectively unbroken as are the rings 4 shown in the other figures of the drawing, wherefore all the rings may be described as having their continuity unbroken, or as being effectively unbroken, or as being effectively circumferentially unbroken.

What is claimed is:—

1. A joint comprising a plurality of members in engagement, and an effectively endless or unbroken expanded tempered ring or loop of metal having a tendency to return toward the initial unexpanded condition, said ring being in embracing relation in the expanded condition to the engaged parts of the members.

2. A joint comprising members to be joined and provided with a seat common to both members with portions interior to the margins of the seat in firm union with said members, and a ring in the seat in gripping relation to the interior parts firmly united to the members, said ring having its continuity effectively unbroken and circumferentially expanded with a tendency to return to the initial unexpanded condition.

3. A joint comprising two members in abutting relation and each formed with a respective portion of a seat matching that of the other portion and having parts interior to the margins of the seat in firm union with the two parts joined together, and an unbroken ring of normally irregular contour and of less free diameter than the internal diameter of the portion of the seat to receive the ring, said ring being expanded toward a radial contour to enter the seat and having a normal tendency to return toward the initial shape.

4. A joint comprising two abutting members formed with coacting parts, and a seat constituting a continuous channel when the members are joined with parts interior to the marginal walls of the channel in firm union with the respective members of the joint, and an unbroken initially corrugated or crimped ring expanded toward the obliteration of the corrugations or crimps and seated in the channel, said ring having a normal tendency to return toward the original corrugated or crimped condition.

5. As an article of manufacture, an effectively endless or unbroken expansible corrugated and tempered ring or loop of metal having a tendency to return toward the initial condition when expanded.

6. As an article of manufacture, an effectively endless ring or loop of metal formed of a bar or rod with the ends twisted together, said ring or loop being corrugated or crimped and tempered.

7. As an article of manufacture, an effectively endless ring or loop of metal formed of a bar or rod with the ends twisted together in the form of interlocking eyes, said ring or loop being corrugated or crimped and tempered.

In testimony that I claim the foregoing as my own, I have hereto affixed my signature in the presence of two witnesses.

WILLIAM L. EVANS, Jr.

Witnesses:
 LYMAN H. O'DONNELL,
 AUSTIN A. TOMEY.